UNITED STATES PATENT OFFICE.

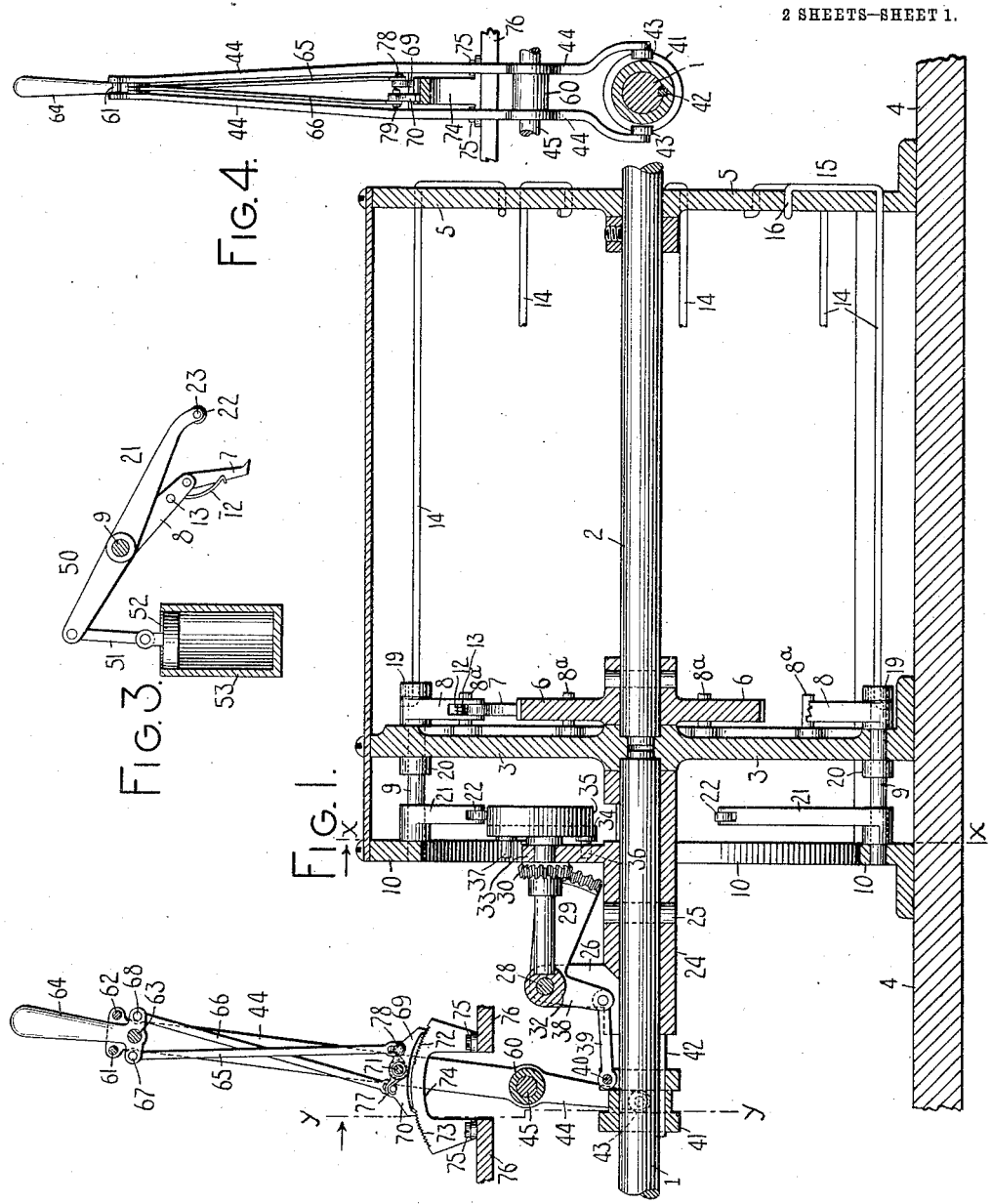

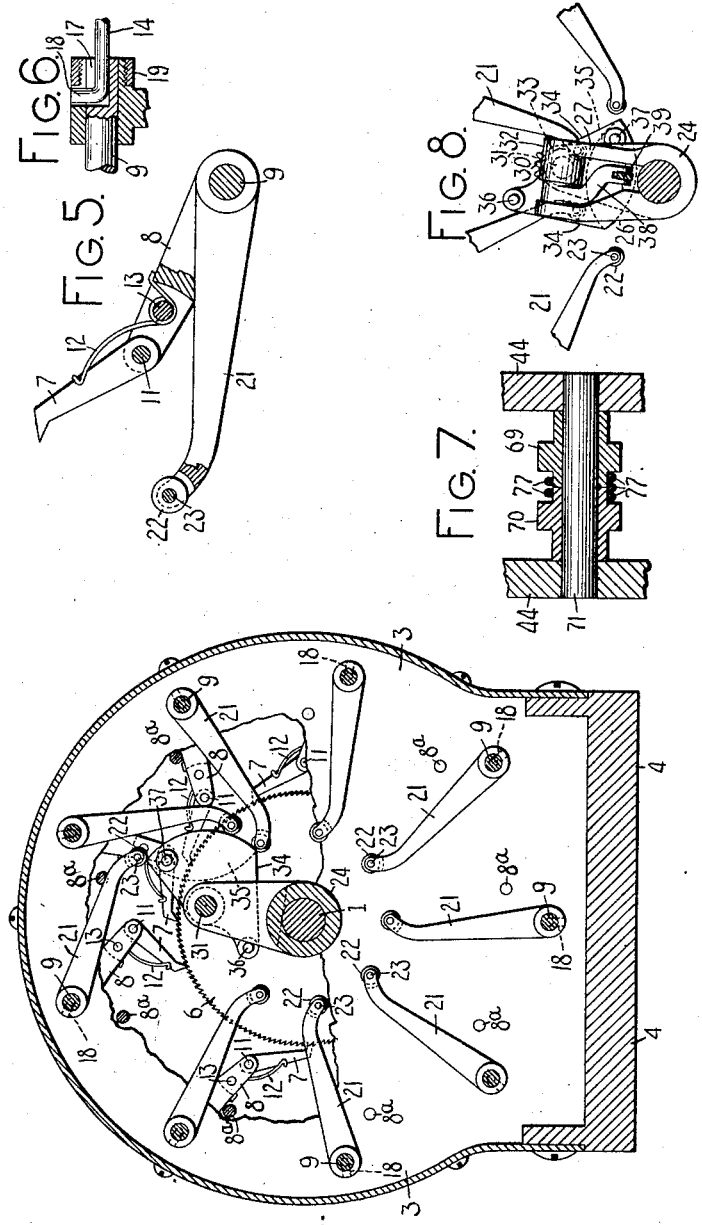

ROBERT H. STROTHER, OF NEW YORK, N. Y.

POWER-TRANSMITTING DEVICE.

1,002,880.  Specification of Letters Patent.  Patented Sept. 12, 1911.

Application filed April 8, 1905. Serial No. 254,491.

*To all whom it may concern:*

Be it known that I, ROBERT H. STROTHER, citizen of the United States, and resident of the borough of Manhattan, city, county, and State of New York, have invented certain new and useful Improvements in Power-Transmitting Devices, of which the following is a specification.

My invention relates to devices for transmitting power, and it consists in certain parts, improvements and combinations which will be fully set forth herein and particularly pointed out in the claims.

By the present invention, the power from a driving member, such, for example, as a shaft connected with a prime mover, is momentarily converted into potential energy, which is again converted into kinetic energy and transmitted to a driven member. The power may be said to be momentarily stored in a storage member, or in a series of such members, and thence transmitted to the driven member. This transformation and transmission of energy may be effected in a great variety of ways and by a great variety of means. In the present case, I shall describe one device in which my invention is embodied, in order to make the principle thereof understood. So far as I am aware, the principle itself is broadly new; and any power transmitting device constructed in accordance with said principle would be within the scope of my invention.

In the accompanying drawings, Figure 1 is a longitudinal vertical sectional view of a power transmitting device; Fig. 2 is a view in section on the line *x—x* of Fig. 1; Fig. 3 is a detail view of a modification; Fig. 4 is a detail view of the regulating lever and its connections, parts being shown in section on the line *y—y* of Fig. 1; and Figs. 5, 6, 7 and 8 are detail views of portions of the mechanism.

The device illustrated in the drawings comprises a driving shaft 1 and a driven shaft 2, arranged end to end and journaled at their adjacent ends in a frame piece 3, which is secured to and rises from a base plate 4. The driven shaft is also journaled in a frame piece 5 which rises from the base plate 4. The driving shaft 1 may be journaled in other bearings. Near the frame piece 3 the driven shaft has fixed thereon a ratchet wheel 6, the teeth of which are engaged by a series of pawls 7 which are pivoted in the free ends of arms 8 which are fixed on rock shafts 9 which are journaled in the frame piece 3 and also in a frame piece 10 which rises from the base plate 4. The rock shafts 9 are parallel to the driving shaft and the driven shaft, and are arranged around said shafts in a circular series, there being nine of said rock shafts in the series here shown. The frame piece 10 is formed with a circular opening concentric with the driving shaft, for a purpose which will appear hereinafter. Each of the arms 8 is slotted or forked at its free ends, and the pawl 7 is pivoted in the slot on a pivot pin 11. Each of the pawls is pressed toward the ratchet wheel by a spring 12, which, as shown in the present case, is coiled about a pin 13 within the slotted end of the arm 8, and presses at one end against said arm and at the other end against the pawl.

Each of the rock shafts 9 has connected thereto one end of a torsion spring 14, which extends parallel to the driven shaft 2 and which is secured at its other end to the frame piece 5, through a hole in which said spring passes. In order to prevent the spring from turning in the frame piece 5, it is bent parallel to the frame piece as shown at 15, and thence back through another hole in said frame piece, as shown at 16. Each of the springs 14 may be rigidly secured to its rock-shaft 9 in any suitable manner. As here shown, a longitudinal slot 17 (Fig. 6) is formed in the end of the rock shaft and in the hub of the arm 8, and the end of the spring is bent at right angles as shown at 18. The end of the spring is laid in the slot 17 and a nut 19, threaded onto the hub, closes the slot and clamps the bent-up end of the spring in position. Endwise motion of the rock-shafts 9 in one direction is prevented by the hubs of the arms 8 engaging the frame piece 3, and collars 20 secured to said shafts on the opposite side of said frame piece, prevent endwise motion of said shafts in the opposite direction. Stop pins 8ᵃ project from the frame plate 3 into the paths of the arms 8 and arrest said arms in normal position.

Just inside the frame piece 10, each of the rock-shafts has rigidly mounted thereon an arm 21 which normally extends from said rock-shaft toward the driving shaft 1. Each of the arms 21 is slotted at its free end, and within the slot an anti-friction roller 22 is journaled on a pin 23.

An elongated hub 24 is rigidly secured on the end of the driving shaft 1 by means of a pin 25 passing through said hub and shaft. As shown in Figs. 1 and 8, two arms 26 and 27 extend from the hub side-by-side, and in said arms is journaled a short transverse rock-shaft 28, on which, between said arms, is rigidly mounted the hub of a segmental bevel gear 29 which meshes with a bevel pinion 30 which is rigidly mounted on a shaft 31 which lies parallel to the driving shaft 1. One end of the shaft 31 is journaled in a boss 32 of the arm 27, in which boss the short shaft 28 is also journaled. The shaft 31 is also journaled in an arm 33 which extends from the hub 24, and on the end of said shaft there is rigidly mounted a segment 34, of the general outline shown in Fig. 2. Projecting from the face of the segment 34 is a cam 35, the periphery of which is in the arc of a circle concentric with the shaft 31. The driving shaft turns toward the right in Fig. 2, and as it turns the cam 35 successively engages the anti-friction rollers 22 on the arms 21, and, pushing said arms before it, rocks the shafts 9 against the tension of the springs 14, until the rollers 22 escape past the cam. In Fig. 2 the cam is shown as it first engages one of the rollers, another roller is moving along the cam, and a third roller is just escaping from the cam. By turning the shaft 31, the cam may be adjusted so as to deflect the arms 21 more or less as may be desired. In Fig. 2 the cam is shown adjusted to deflect the arms to the greatest extent it is capable of, and in Fig. 8 said cam is adjusted to clear the rollers altogether, so that the rotation of the driving shaft does not operate the arms 21 at all. The outline of the cam projection 35 on the side nearest the shaft 31 is such that, when the cam is adjusted in its inoperative position, said outline is in the arc of a circle concentric with the shaft 1, said arc being of a radius less than the distance from the center of the driving shaft to the rollers 22, as shown by the dotted line in Fig. 8. The thickness of the segment 34 is indicated by a dotted line in Fig. 1, by reference to which it will be seen that it is only the cam projection of said segment that lies in the path of the rollers 22. By turning the shaft 31, the cam may obviously be adjusted to either of its extreme positions shown in Figs. 8 and 2 respectively, or to any intermediate position. In order to prevent motion of the segment 34 beyond these extreme positions, two stop pins 36 and 37 project from said segment in position to engage the arm 33 when the segment stands in one or the other of its extreme positions. The shaft 31 is turned to adjust the cam by means of the segmental gear 29 which meshes with the pinion 30. An arm 38 projects from the hub of said segment toward the shaft 1, and to said arm is pivoted one end of a link 39, the other end of which is pivoted at 40 to a sleeve 41, slidably mounted on said shaft 1. Relative rotation of said shaft and sleeve is prevented by a spline 42. The sliding sleeve is formed with a peripheral groove in which run anti-friction rollers 43 mounted in the end of a forked lever 44 which is journaled on a shaft 45 which is suitably mounted in the stationary frame-work. The lever 44 is adapted to be adjusted and held in adjusted position in a manner which will be particularly described hereinafter. The construction is such that, by moving the lever 44 one way or another, the sleeve 41 may be slid along the shaft 1, and the motion of said sleeve will be communicated by the link 39 to the arm 38, rocking the segment 29 and turning the shaft 31 and cam 35. This adjustment may be effected while the driving shaft is in motion.

The operation of my device for transmitting power may be understood from the foregoing description. The shaft 1 may be connected with any source of power by which it may be continuously rotated. If the cam 35 be set in the position shown in Fig. 8, the rotation of the driving shaft will have no effect on the driven shaft, as the cam will revolve with the driving shaft without touching the rollers 22. If now the upper end of the lever 44 be moved a short distance toward the right to the position shown in Fig. 1, the cam will be turned up to the position shown in Figs. 1 and 2. As the cam revolves, it will then successively engage the rollers 22 and rock the arms 21 and rock shafts 9 against the tension of the springs 14, as explained above and as indicated in Fig. 2. When any rock shaft 9 is thus rocked, the arm 8 mounted thereon is also rocked, and the pawl 7 is drawn forward and caused to engage the ratchet wheel 6 at a position in advance of its normal position. When the roller 22 escapes from the cam, the tension of the spring 14 is exerted through the pawl 7 against the ratchet wheel 6, which it tends to turn. Obviously, each of the springs 14 is placed under tension once at each rotation of the driving shaft, and the reaction of these springs on the ratchet wheel turns the driven shaft. Each of the springs is twisted to a definite extent at each rotation of the driving shaft, and a definite amount of the energy of said shaft is thus momentarily stored in said spring as potential energy, which, when the roller 22 escapes from the cam, is then transmitted to the driven shaft. Upon each rotation of the driving shaft, each spring thus absorbs a definite amount of energy, and therefore, the series of springs absorbs a definite amount of energy, and this energy is transmitted to the driven shaft. If the driving shaft rotates at a uniform speed, the springs will absorb from it and transmit to the driven shaft a definite amount of energy per unit of time—that is to say, it will transmit a definite horse-power. For example, if each spring absorbs one foot-pound when twisted to the extent indicated in Fig. 2, then at each rotation of the driving shaft, the nine springs shown in the present case will absorb and transmit nine foot-pounds of energy. If the driving shaft makes six hundred revolutions per minute, the springs will absorb from it and transmit to the driven shaft, 600×9=5400 foot pounds per minute, or about one-sixth of a horse power. The velocity which will be thus imparted to the ratchet wheel 6 and the driven shaft 2 will depend upon the load on the shaft. If the load is light, the springs 14 will react quickly and impart a high speed to the shaft; whereas if the load is heavy, they will react more slowly and impart a less velocity to the shaft. In any event the shaft will absorb and transmit the horse power transmitted to it by the springs. It will be perceived that if the load on shaft 2 is light and said shaft consequently rotates at a high speed, each spring will require but a short time within which to recover its normal position, so that only a small number of springs will be exerting their tension against the ratchet wheel at a time. The heaviest load that the shaft 2 can sustain and transmit the entire horse-power of which the springs are capable, would be such a load that any given spring would have recovered its normal position just before the cam 35 reaches the roller 22, corresponding to that spring. If said cam reached said roller before the spring had recovered its normal condition, said spring would be again twisted without having transmitted to the driven shaft all of the energy which had been stored in it. The result would be that upon the second rotation of the driving shaft each spring would not absorb from the cam the whole amount of energy which the spring is capable of storing, but only the amount which it has previously transmitted to the ratchet-wheel, so that the effect of overloading the shaft 2 would be to lighten the load on the driving shaft. Obviously if the driven shaft were locked altogether, the first rotation of the driving shaft would bend all of the springs which would be held in this bent condition by the engagement of the pawls 7 with the ratchet wheel 6 after which the shaft 1 would run free. If the shaft 1 be connected with the motor of an automobile, and the shaft 2 be geared to the driving wheels, said motor will transmit to said wheels an amount of power depending upon the speed of the shaft 1 and upon the adjustment of the cam 35, and the speed of the automobile will depend upon the characters of the road. If the resistance to the machine is slight, it will run at a high speed, but if this resistance be increased by the heaviness of the road or the steepness of the grade, the machine will run at whatever speed the power transmitted to the wheel is capable of imparting to it. In case of any very unusual resistance, such as might be due to the wheels getting into a rut or encountering a very steep grade, the whole force of all of the springs will be momentarily available to overcome the unusual resistance. It will be perceived, however, that none of the sudden and great changes in load or resistance to be overcome, to which an automobile is subject, will be felt by the motor, which merely continues to bend the springs one after another, without any reference at all to the resistance which these springs encounter in returning to normal position. If at any time the operator of the machine wishes to go faster, he simply pushes the lever 44 forward, and if he wishes to go slower, he pushes it back, thus affording an extremely simple means for controlling the machine.

It will of course be understood that springs may be connected with the rock shaft 9 in many different ways, and that many different forms of mechanism may be devised by which the energy of a driving member may be momentarily converted into potential energy in a spring and from the spring be transmitted to a driven member. It will also be understood that the storage member or series of storage members need not necessarily be springs at all but the energy may be momentarily rendered potential in other storage members; for example, in some instances, this may be done by raising weights and permitting them, when they descend, to transmit the energy stored in them to a driven member. In Fig. 3 I have illustrated a construction in which the storage members consist of cylinders in which air is compressed by pistons. In this construction the rock shaft 9 and arms 21 and 8 and the pawls 7 are the same as in the construction illustrated in the other figures of the drawing. The rock shaft has an arm 50 projecting therefrom, which is connected by a link 51 with a piston 52 which works in an air cylinder 53. When the arm 21 and shaft 9 are rocked by the cam 35, the piston 52 is depressed in the cylinder, compressing the air beneath it. As soon as the roller 22 escapes from the cam, the expansion of this compressed air tends to restore the parts to normal position and through the pawl 7 to rotate the notched wheel 6 and driven shaft 2. This form of storage member is preferable in instances where the device is designed to transmit a considerable amount of power.

It will also be understood that the ratchet wheel 6 and pawls 7 may be replaced by any other mechanical movement, which will permit the parts to have free relative movement in one direction and not in the other.

It will be understood that the amount of power or energy stored in each storage member upon each rotation of the driving shaft may be varied in other ways than by changing the adjustment of the cam 35. For example, the amount of power stored in each of the springs 14 may be varied by placing said springs under more or less initial tension. This could readily be done by turning the arms 15 of said springs, this giving them an initial twist. In the case of the form of storage member shown in Fig. 3, air may be pumped into the cylinder below the piston so that there will be an initial pressure on each piston and the amount of energy stored in the compressed air by a stroke of the piston would be increased.

The handle by which the cam 35 is adjusted is of a peculiar construction which will now be described. By reference to Fig. 2, it will be observed that the rollers 22, running over the circular face of this cam, tend to turn it to the left, this tendency being due to friction alone, as the face of the cam is concentric with the shaft 31 on which it is mounted. At the moment when one of said rollers is escaping past the upper end of the cam, however, said roller, impelled by its spring 14, gives the cam a thrust to the right. The cam is thus subjected to rapidly alternating forces tending to turn it first to the left then to the right, and thus alternating forces are transmitted to the lever 44 by which the cam is controlled. It is therefore necessary that said lever be held against motion in either direction. It will be perceived that if the lever 44 be free to move in one direction and not in the other, it will be moved in that direction by a rapid succession of jerks. I have provided means whereby the lever 44 is normally held against motion in either direction. I have also provided means whereby, if the handle be pulled in either direction, it will release the lever and allow it to move in that direction but not in the other. Moreover, the lever is free to move in one direction or the other only so long and so far as the handle is pulled in that direction. The moment the operator ceases to pull on the handle, the lever is locked against any further motion.

The lever 44 is made of two strips or bars spaced apart as shown in Fig. 4, and connected together at two or three points. Said bars are connected together near their lower ends by a sleeve 60 which surrounds the shaft 45, and near their upper ends by pins 61, 62 and 63. The handle 64 is pivoted on the pin 63 between the two bars and the pins 61 and 62 serve as stops to limit its motion in either direction. Said handle has the shape of an inverted T, and two links 65 and 66 are respectively pivoted to the two arms of the handle at 67 and 68. Said links extend downward between the bars of the lever, crossing each other as shown in Fig. 1, and are connected at their lower ends to two pawls 69 and 70 which are pivoted on a rod 71 that extends from one to the other of the bars of the lever 44. Said pawls 69 and 70 extend in opposite directions from the rod 71 and coöperate respectively with ratchet teeth 72 and 73, formed on the upper edge of a segment 74 which lies between the bars of the lever 44 and is secured by screws 75 to a suitable part 76 of the fixed framework.

The pawl 69 and ratchet 72 are adapted to hold the lever 44 against motion toward the right, and the pawl 70 and ratchet 73 are adapted to hold said lever against motion toward the left. A spring 77 (Figs. 1 and 7) is coiled about the hubs of the pawls and pressed against pins 78 and 79 mounted in the pawls 69 and 70 respectively and holds said pawls in engagement with the ratchets. Said pins project entirely through said pawls and are headed on their outer ends, and they pass loosely through elongated slots in the lower ends of the links 65 and 66. The pins normally rest in the lower ends of said slots, and through them the spring 71 normally holds the handle 64 in the position shown in Fig. 1, midway between the stop pins 61 and 62. In this position, both pawls are in engagement with their ratchets and the lever 44 is locked against motion in either direction. If the handle 64 be pushed toward the right in Fig. 1, until it engages the stop 62, the link 65 will raise the pawl 69 out of engagement with the ratchet 72, but the link 66 will not affect the pawl 70 on account of the slot in the lower end of said link. The lever 44 will then move toward the right, impelled by the jerks which have been described and also by the pressure of the handle 64 against the pin 62. If the pressure on said handle be relaxed, the spring 77 will again press the pawl 69 against its ratchet and thus lock the lever in its new position. The lever may be moved in the opposite direction in the same manner, the pawl 70 being raised in this operation.

I claim:

1. In a power transmitting device the combination of a continuously moving driving member, a driven member, a storage member by which energy is received from the driving member in a succession of impulses and from which such energy is transmitted to said driven member, and means for enabling said storage member to impart to said driven member different extents of motion at different equal impulses, depending on the amount of the load on said driven member.

2. In a power transmitting device, the combination of a driving member; a driven member; a series of storage members in which energy from the driving member is momentarily stored and from which the energy is transmitted to the driven member, and means for connecting said storage members one after another in succession, to receive energy from said driving member.

3. In a power transmitting device, the combination of a continuously moving driving member; a driven member; and mechanical means forming the connection between said driving and driven members for momentarily converting successive units of the energy of the driving member into potential energy and transmitting said energy to the driven member and moving said driven member different distances per unit of energy so transmitted, depending on the amount of the load on the driven member, the driving member being unaffected by such differences in load.

4. In a power transmitting device, the combination of a driving member; a driven member; mechanical means for momentarily converting successive units of the energy of said driving member into potential energy and transmitting said energy to the driven member; and means for regulating the amount of energy in each unit.

5. In a power transmitting device, the combination of a driving shaft; a driven shaft; mechanical means for momentarily converting energy from the driving shaft into potential energy and transmitting it to the driven shaft; and means for regulating the amount of energy thus converted at each rotation of the driving shaft.

6. In a power transmitting device, the combination of a driving member; a driven member; and a series of elastic members which are put under tension by the power of the driving member and from which such power is transmitted to the driven member.

7. In a power transmitting device, the combination of a driving shaft; a driven shaft; and a series of springs which are successively put under tension by the power of the driving shaft and from which such power is transmitted to the driven shaft.

8. In a power transmitting device, the combination of a driving shaft; a driven shaft; a series of springs which are successively put under tension by the power of the driving shaft and from which such power is transmitted to the driven shaft; and means for regulating the degree of tension under which said springs are put by the driving shaft.

9. In a power transmitting device, the combination of a driving member; a driven member not positively connected with said driving member; and a series of to and fro moving devices which are moved in one direction by the driving member and which, by their recoil, actuate the driven member.

10. In a power transmitting device, the combination of a driving shaft; a series of arms; elastic members connected with said arms; means whereby said arms are moved by said driving shaft to put said elastic members under tension; a driven shaft not positively connected with said driving shaft; and means whereby said elastic members actuate said driven shaft.

11. In a power transmitting device, the combination of a driving shaft; a series of springs; means whereby said springs are successively put under tension by said driving shaft; a driven shaft; and means whereby said driven shaft is actuated by the reaction of said springs.

12. In a power transmitting device, the combination of a driving shaft; a series of springs; means whereby said springs are successively put under tension by said driving shaft; means for regulating the degree of tension under which said springs are put by the driving shaft; a driven shaft; and means whereby said driven shaft is actuated by the reaction of said springs.

13. In a power transmitting device, the combination of a driving shaft; a series of elements which are successively displaced by said driving shaft; a series of members in which power is stored by the displacement of said elements; a driven shaft; and means whereby the power stored in said members is transmitted to said driven shaft.

14. In a power transmitting device, the combination of a driving shaft; a series of elements which are successively displaced by said driving shaft; a series of members in which power is stored by the displacement of said elements; means for regulating the distance through which said elements are displaced; a driven shaft; and means for transmitting to said driven shaft the power stored in said members.

15. In a power transmitting device, the combination of a driving member; a series of to and fro moving elements moved in one direction by said driving member; a series of storage members in which power is stored when said to and fro moving elements are displaced, and a driven member adapted to have freedom of motion with respect to said elements in one direction but not in the other.

16. In a power transmitting device, the combination of a driving shaft; a cam mounted on said driving shaft; a series of arms adapted to be engaged by said cam, a series of storage members adapted to have power stored therein when said arms are displaced by said cam; a driven shaft; means whereby the reaction of said storage members actuate said driven shaft; and means for adjusting said cam.

17. In a power transmitting device, the combination of a driving shaft and a driven shaft arranged end to end; an adjustable cam mounted on said driving shaft; a series of rock shafts arranged about said driving and driven shafts; a series of arms projecting from said rock shafts into the path of said cam; a series of springs connected with said rock shafts; a series of pawls connected with said rock shafts; and a ratchet wheel mounted on said driven shaft and engaged by said pawls.

18. In a power transmitting device, the combination of a driving shaft and a driven shaft, an arm on said driving shaft, a cam pivotally mounted on said arm, means for rotating said cam about its pivot, said means comprising a pinion connected with said cam, a segmental gear engaging said pinion, a collar slidably mounted on said shaft, a lever controlling said collar, a handle mounted on said lever, oppositely disposed pawls controlled by said handle to normally lock said lever, and means whereby when said handle is pulled in either direction, one of said pawls is lifted out of engagement with its ratchet to permit motion of said lever in the direction in which the handle is pulled; stationary ratchets engaged by said pawls, a series of storage members displaced by said cam to store therein the energy of the driving shaft; and means for transmitting to the driven shaft the energy stored in said storage members.

19. In a power transmitting device, the combination of a driving shaft, a driven shaft, a series of elastic members, means whereby said driving shaft puts said elastic members under tension, means for adjusting said last mentioned means to operative or inoperative position, and means for transmitting to the driven shaft the power stored in said elastic members by said driving shaft.

20. In a power transmitting device, the combination of a driving shaft, a driven shaft not positively connected with said driving shaft, a series of torsion springs, means whereby said driving shaft twists said torsion springs, and means whereby the reaction of said springs actuates said driven shaft.

21. In a power transmission, the combination of a driving shaft and a driven shaft, each free to rotate independently of the other, and a series of mechanical storage members in which, one after another in rapid succession, power is stored by said driving shaft, such power being transmitted to the driven shaft and rotating said driven shaft more or less rapidly depending on the load.

Signed at the borough of Manhattan, in the city, county and State of New York, this 7th day of April, A. D. 1905.

ROBERT H. STROTHER.

Witnesses:
M. W. POOL,
CHARLES E. SMITH.

---

Copies of this patent may be obtained for five cents each, by addressing the "Commissioner of Patents, Washington, D. C."